United States Patent
LaBerge

(10) Patent No.: US 7,165,209 B2
(45) Date of Patent: Jan. 16, 2007

(54) SYSTEM AND METHOD FOR USE OF SHORTENING AND PUNCTURING IN AN ADAPATIVE CODE FOR BAND AND TIME-SELECTIVE COMMUNICATIONS

(75) Inventor: E. F. Charles LaBerge, Towson, MD (US)

(73) Assignee: Honeywell International Inc., Morristown, NJ (US)

( * ) Notice: Subject to any disclaimer, the term of this patent is extended or adjusted under 35 U.S.C. 154(b) by 543 days.

(21) Appl. No.: 10/754,570

(22) Filed: Jan. 12, 2004

(65) Prior Publication Data

US 2004/0187070 A1    Sep. 23, 2004

Related U.S. Application Data

(60) Provisional application No. 60/440,018, filed on Jan. 15, 2003.

(51) Int. Cl.
*H03M 13/03* (2006.01)
(52) U.S. Cl. ...................................................... 714/790
(58) Field of Classification Search ................ 714/790, 714/800
See application file for complete search history.

(56) References Cited

U.S. PATENT DOCUMENTS

| | | | |
|---|---|---|---|
| 6,122,763 | A | 9/2000 | Pyndiah et al. |
| 6,993,697 | B1 | 1/2006 | Chapalain et al. |
| 2002/0075834 | A1 | 6/2002 | Shah et al. |

FOREIGN PATENT DOCUMENTS

| | | |
|---|---|---|
| EP | 0 942 550 | 9/1999 |
| WO | WO 02/062002 | 8/2002 |

OTHER PUBLICATIONS

Nikaein et al., Qos-based adaptive error control for wireless networks, Jul. 2002, wireless communications and mobile computing, John Wiley & sons, Ltd., p. 37-50.*
Djandji, Habib, An efficient hybrid ARQ protocol for point to multipont communication and its throughput performance, Sep. 1999, IEEE Trans. on Vehicular Tech., vol. 48, No. 5, p. 1688-1698.*
Liu et al., Error control schemes for networks: an overview, 1997, Mobile networks and applications, baltzer science publishers BV, p. 167-182.*
Choi et al. "A Class of Adaptive Hybrid ARQ Schemes for Wireless Links", IEEE Transactions on Vehicular Technology, vol. 50, No. 3, May 2001, pp. 777-790.
PCT/US2004/000712 Copy of International Search Report and Written Opinion.

* cited by examiner

*Primary Examiner*—Shelly Chase
(74) *Attorney, Agent, or Firm*—Fogg and Associates LLC

(57) ABSTRACT

A method for encoding a data communication includes measuring a communications channel to determine available time slots and available bandwidth, and determining puncturing and shortening information from the available time slots and the available bandwidth. Puncturing information includes a number of bits p to be punctured and an identity of bits to be punctured and shortening information; whereas, shortening information includes a number of bits s to be shortened and an identity of bits to be shortened. Puncturing is performed on a first dimension, and shortening is performed on a second dimension.

17 Claims, 5 Drawing Sheets

SYSTEM AND METHOD FOR USE OF SHORTENING AND PUNCTURING IN AN ADAPATIVE CODE FOR BAND AND TIME-SELECTIVE COMMUNICATIONS

This application claims the benefit of U.S. Provisional Application No. 60/440,018, filed Jan. 15, 2003, which is incorporated herein in its entirety.

BACKGROUND

1. Field of the Invention

The present invention relates generally to communication systems. More specifically, the present invention is directed to systems and methods for improving digitally encoded transmissions.

2. Background of the Invention

The next generation of military and civilian communications products will incorporate the ability to dynamically adjust their use of spectrum based on measurements of the installed environment. Maintaining the required quality of service (bit error rate, transfer delay, etc.) will usually require the use of various coding methods, including modem concatenated coding and iterative decoding techniques. To obtain the maximum benefit, a given system will require some means of adapting the coding parameters and the transmitted waveform to the time and spectrum constraints indicated by the measurement of the environment.

Consider the idealized communications system 100 represented by FIG. 1. The communication is represented by a three-dimensional box or communications box 120 drawn against time, frequency and power (i.e., spectral density) axes. The time (t) axis has units of seconds, the frequency (f) axis has units of Hertz ("Hz"), and the spectral density (S) axis has units of watts per Hertz ("W/Hz"). Communications box 120 shows that a communication occupies a certain band of frequencies f by transmitting a certain power spectral density S over a certain period of time t. The volume of the communications box represents the total energy. In other words, E=S·f·t, where S is the power spectral density, f is the effective bandwidth, and t is the effective duration of the transmission, as indicated in FIG. 1. Multiplying the units of S,f, and t shows that the energy has units of joules ("J"), as shown below:

$$\left(\frac{W}{Hz}\right) \times (Hz) \times (s) = W \cdot s = J.$$

If there are a total of K information bits transmitted during this process, then the average energy per bit $E_b$ is $$E_b = \frac{E}{K}.$$

The average bit- or word-error rate for the K bit information word is a monotonically decreasing function of $E_b$.

In the usual communications system design process, the maximum acceptable error rate, maximum permissible frequency band, and maximum time duration for a transmission are established as design constraints. Based on these constraints, a communications engineer develops a coding scheme using well-established methods.

Texts such as, S. Wicker, *Error Control Systems for Digital Communication and Storage*, Upper Saddle River, N.J.: Prentice Hall, 1994; C. Heegard and S. Wicker, *Turbo Coding*, Boston: Kluwer Academic Publishers, 1999; B. Vucetic and Y. Jinhong, *Turbo Codes*, Boston: Kluwer Academic Publishers, 2000; S. Lin and D. J. Costello, *Error Control Coding: Fundamentals and Applications*, Englewood Cliffs, N.J.: Prentice-Hall, Inc., 1983; and R. G. Gallager, *Information Theory and Reliable Communication*, New York: John Wiley & Sons, 1968 describe conventional coding schemes.

Some communication systems desire to achieve a given error rate performance at a data rate that is adjustable to account for time-varying channel conditions, such as a time-varying signal-to-noise ratio. This requires adaptation of the transmitted codewords to the current channel conditions. Popular techniques for accomplishing this adaptation include Automatic Repeat Request (ARQ) and Hybrid Automatic Repeat Request (HARQ). ARQ and HARQ techniques, which are described in the first four texts mentioned above, are adaptive error-control schemes that choose an error-control code and frame length adaptively based on an estimated channel state or condition. The approach of these techniques is to hold the communications bandwidth, f, and the power spectral density, S, constant and to incrementally increase the time required to complete the transmission, as shown in FIG. 2.

FIG. 2 is a box diagram showing a communication transmitted using ARQ/HARQ adaptive techniques. As shown in FIG. 2, communication 200 occupies a certain band of frequencies f by transmitting a certain power spectral density S over a certain period of time t as three separate transmissions, first transmission 202, second transmission 204, and third transmission 206. The power spectral density S and the effective bandwidth f of the three transmissions are held constant. However, the duration of first transmission 202 $t_1$, the duration of second transmission 204 $t_2$, and third transmission 206 $t_3$ are adaptively chosen based upon an estimated channel state or condition. The sum of durations $t_1$, $t_2$, and $t_3$ for each transmission 202, 204, and 206 equals the total duration t of the transmission of communication 200.

As described above, ARQ/HARQ techniques adaptively adjust along the time dimension, while holding the frequency and power spectral density dimensions fixed. This approach allows a communication system to achieve a given error rate performance at a varying data rate.

Broadly speaking, the error-correcting ability of a linear code increases as the code rate $$R = \frac{K}{N}$$

decreases, where R is the rate, usually expressed as a rational fraction, K is the number of information bits per codeword and N≧K is the number of encoded bits per codeword. In each codeword, there are N–K redundant bits called parity bits. The parity bits provide error correction, such that as the number of parity bits increases (i.e., larger N–K), the error-correction capability also increases. Such a code is referred to as a (N,K) code.

A (N,K) code is designed to achieve the desired error rate performance at a specified channel signal-to-noise ratio. The "maximum" modulation scheme is designed to achieve this signal-to-noise ratio with a given power spectral density. This essentially establishes the (S,f,t) triple illustrated in FIG. 1.

However, once a linear code has been designed and K and N are chosen, the code structure may be adjusted using techniques, such as puncturing and shortening. Other techniques, referred to as lengthening, augmenting, expurgating and truncating are also used to adjust the code rate, but these techniques are not part of the present invention.

Shortening reduces the number of data bits contained in each codeword, while retaining the basic code structure. Of course, reducing the number of bits per code word increases the number of code words in an entire message. By increasing the number of code words, shortening also increases the average transfer delay. However, decreasing the number of bits per codeword provides a higher proportion of parity bits to bits per code word, thereby strengthening error correction performance. Thus, shortening decreases the code rate and strengthens performance.

Puncturing reduces the number of parity bits contained in each codeword. Reducing the number of parity bits, decreases the size of a code word, thereby causing a faster code rate. However, decreasing the number of parity bits decreases error-correcting capability. Thus, puncturing increases the code rate and weakens the performance.

Current shortening and puncturing techniques are limited in that they only adjust in one dimension, namely time or frequency. For the next generation of communication systems, it is highly desirable that time, frequency, and power spectral density are dynamically adjustable based on the measured characteristics of the user environment. Adjustment of the power spectral density by controlling the power axis is regularly performed in current systems, based on measurement of the channel signal-to-noise ratio. However, current techniques do not adjust time and frequency simultaneously and independently. Thus, what is needed is a system and method for adapting conventional puncturing and shortening techniques to adjust the time and frequency dimensions simultaneously and independently.

BRIEF SUMMARY OF THE INVENTION

The present invention provides a method for encoding a data transmission of user data provided from a source.

In the present invention, a communications channel is measured to determine available time slots and available bandwidth. Puncturing and shortening information is determined from the available time slots and the available bandwidth. Puncturing information includes a number of bits p to be punctured and an identity of bits to be punctured and shortening information includes a number of bits s to be shortened and an identity of bits to be shortened.

Upon receiving a K-bit data word at an encoder from the user data source, a method consistent with principles of the present invention encodes the (K-s)-bit data word into an (N-s)-bit code word. Here, N>K and N−(K-s) is a number of parity bits, where s is the number of shortened bits. Thus the encoding operation explicitly implements the shortening operation. Shortened bits are not discarded but are retained at the transmitter and appended to the next data word before shortening. Depending on the properties of the physical layer communications protocol used to actually perform the transmission, this process may result in an increase in the total number of code words necessary to transmit a fixed number of input data bits. Puncturing operations may then be performed on the (N-s)-bit code word to form an (N-s-p)-bit code word with (K-s) data bits, where p is the number of punctured bits. In a non-limiting example, puncturing is performed on a first dimension and shortening is performed on a second dimension.

DETAILED DESCRIPTION OF THE INVENTION

This invention applies two standard code-adjustment techniques—shortening and puncturing—to the control of the time and frequency characteristics of a transmitted waveform. The invention makes the innovative connection of identifying each technique (i.e. shortening or puncturing) with either time or frequency control. By independently varying the code-adjustment parameters, the invention simultaneously varies the time and frequency content of the transmitted waveform. One innovative element is the connection between shortening/time and puncturing/frequency or shortening/frequency and puncturing/time.

Figure 1:
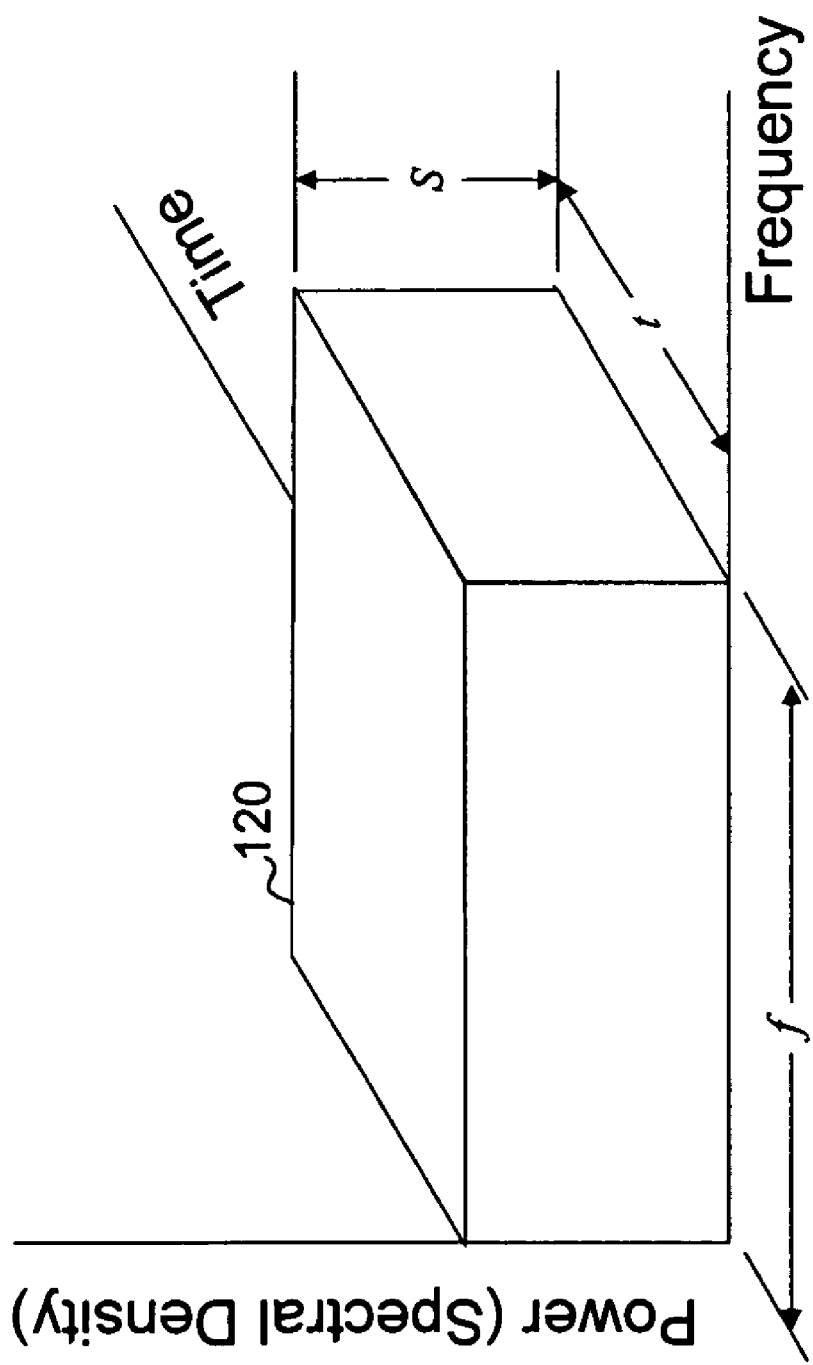
FIG. 1 is a box diagram showing a communication transmitted in an idealized communications system.
Figure 2:
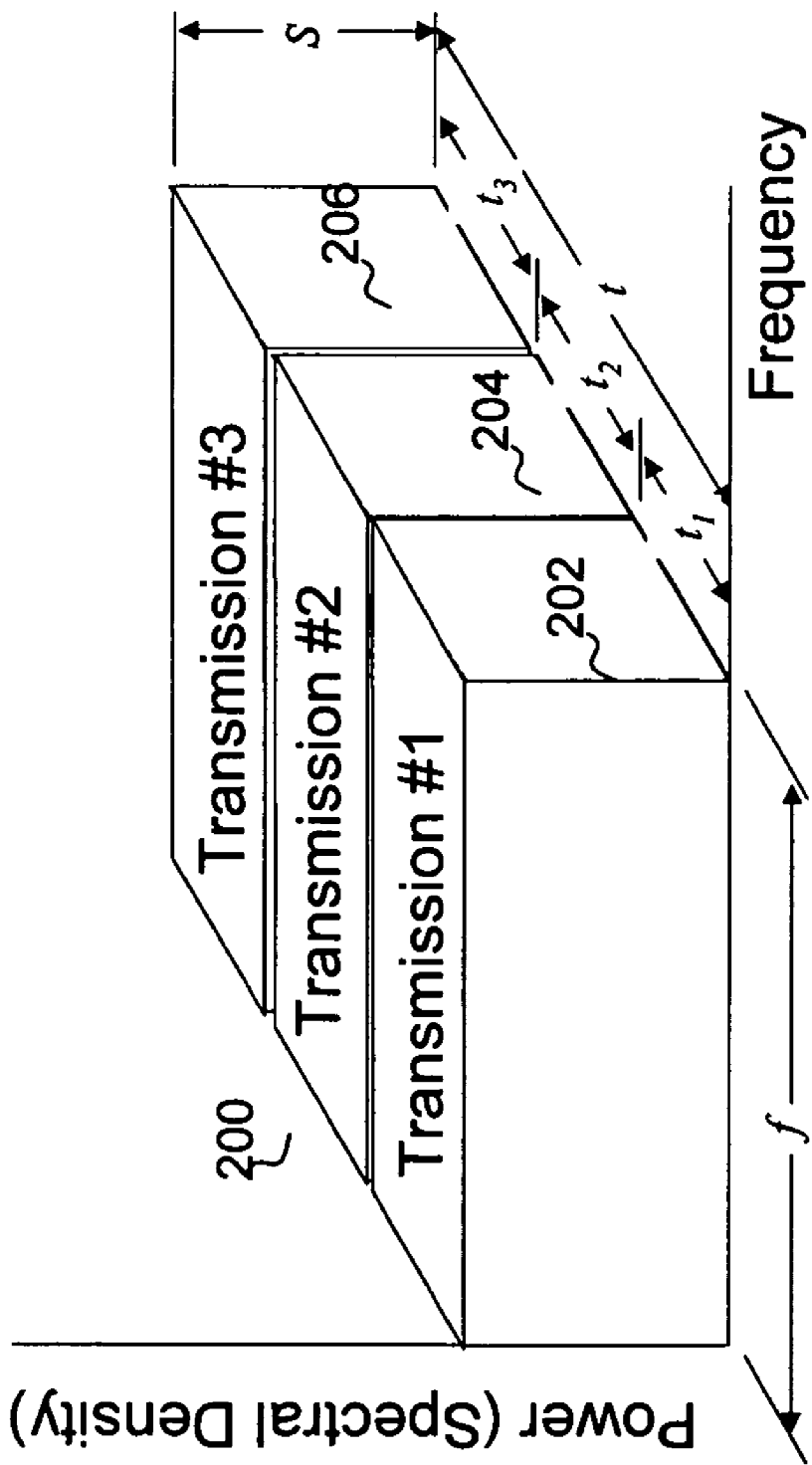
FIG. 2 is a box diagram showing a communication transmitted using ARQ/HARQ adaptive techniques.
Figure 3:
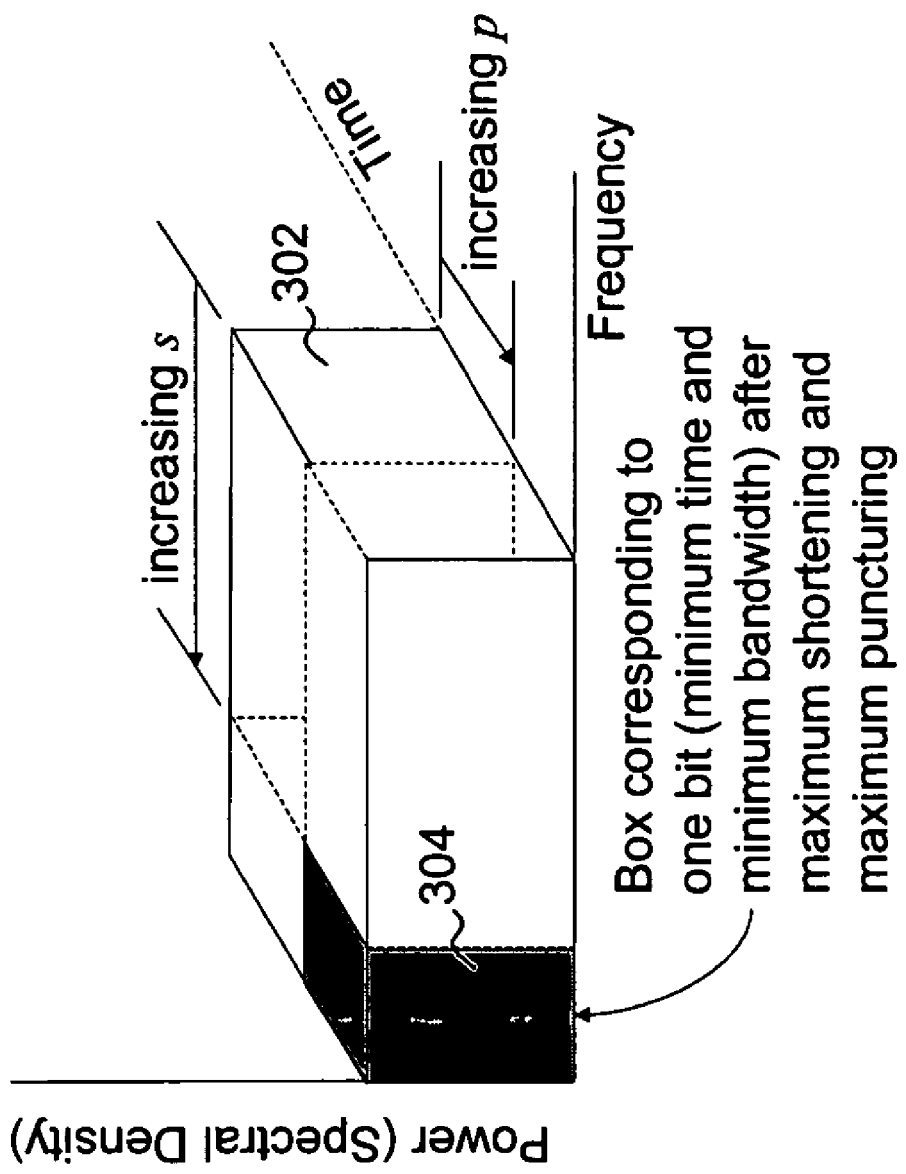
FIG. 3 is a box diagram showing a communication transmitted according to an exemplary embodiment of the present invention.

FIG. 3 is a box diagram showing a communication transmitted according to an exemplary embodiment of the present invention. Particularly, FIG. 3 shows a first communications box 302 representing a communication to be processed for transmission and a second communications box 304 representing a communication transmission. The communication transmission has a puncturing parameter p associated with the time duration of the transmitted waveform and a shortening parameter s associated with an effective bandwidth of the transmitted waveform. That is, a puncturing operation is identified with time control, and the shortening operation is identified with frequency control. In an alternative embodiment of the present invention (not shown), a puncturing operation is identified with frequency control and the shortening operation is identified with time control. Thus, the present invention allows puncturing/time and shortening/frequency or puncturing/frequency and shortening/time.

First, an (N,K) code is designed is designed for maximum length and maximum bandwidth with a given power spectral density. This communications link is represented by the communications box 302. The communications box 302 is punctured by a puncturing parameter p and shortened by a shortening parameter s. Puncturing parameter p represents the number of parity bits per codeword to be punctured or reduced; whereas, shortening parameter s represents the number of information bits per codeword to be shortened or reduced. Puncturing reduces first communications box 302 by p bits in the time domain. Similarly, shortening reduces first communications box 302 by s bits in the frequency domain. Thus, puncturing parameter p and shortening parameter s determine the dimensions of second communications box 304. Here, box 304 represents the minimum time and minimum bandwidth of one bit after maximum shortening and maximum puncturing.

In accordance with the present invention, second box 304 can be designed with the desired time and frequency characteristics for transmission to achieve a desired error-control rate. Here, increasing p to its maximum value decreases the time duration of the transmitted waveform at the cost of a weaker error rate performance. Similarly, increasing s to its maximum value decreases the required spectrum and restores the error rate performance by decreasing the code rate. In the non-limiting example shown in FIG. 3, box 304 is reduced to one bit after maximum shortening and puncturing.

Particularly, values of p and s are determined based upon measurements of conditions in the current channel, such as the signal-to-noise ratio. As described earlier, communication systems are designed with a maximum acceptable error rate as a design constraint. However, a (N,K) code is designed to achieve the desired error rate performance at a specified channel signal-to-noise ratio.

Upon measuring the external channel, the invention selects the puncturing parameter p and the shortening parameter s to achieve the desired time-frequency characteristics. Referring to FIG. 3, once the maximum box dimensions are known by design, s and p determine the effective dimensions of the communications box. Increasing p, that is, transmitting fewer parity bits per codeword, decreases the time duration of the transmitted waveform at the cost of a weaker error rate performance. Increasing s, that is, transmitting fewer information bits per codeword both decreases the required spectrum and restores the error rate performance by decreasing the code rate. Thus, this invention adjusts both the time and frequency characteristics of the transmitted waveform directly by adjusting the code structure.

Used together with a (N,K) code, shortening by s bits and puncturing by p bits results in a code with a rate $$R(s, p) = \frac{K-s}{N-s-p}, 0 \leq s < K, 0 \leq p \leq N-K$$

that satisfies the relationship $$\frac{1}{N} \leq R(s, p) \leq 1.$$

Figure 4:
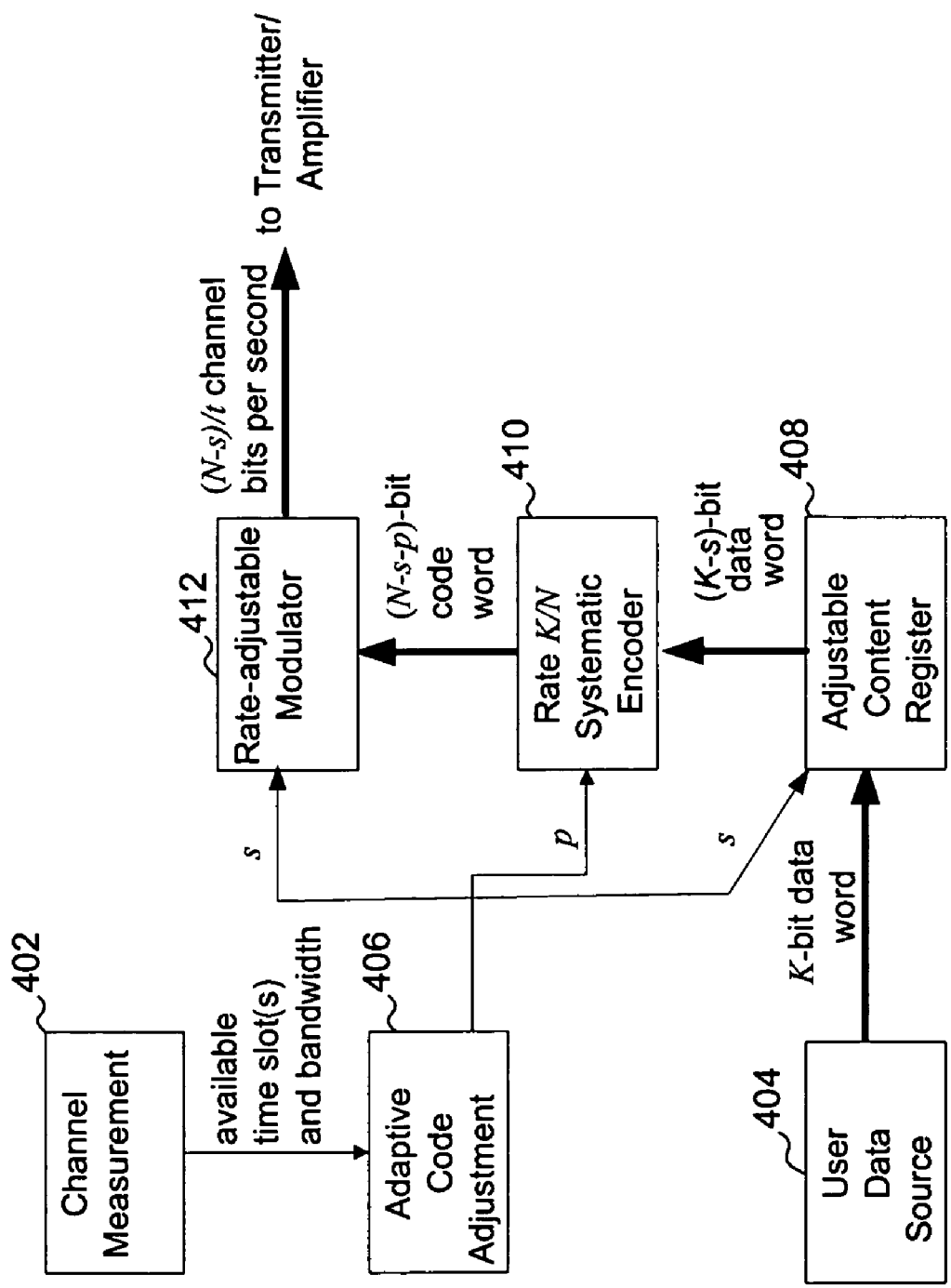
FIG. 4 is a schematic diagram of a communication transmitter according to an exemplary embodiment of the present invention.

FIG. 4 is a schematic diagram of a portion of a communication transmitter according to an exemplary embodiment of the present invention. This portion includes channel measurement unit 402, user data source 404, adaptive code adjustment unit 406, adjustable content register 408, rate K/N systematic encoder 410, and rate-adjustable modulator 412.

System inputs to the communication transmitter include information from channel measurement unit 402 and user data source 404. Channel measurement unit 402 is an apparatus for continually measuring the current communications channel to detect the presence of other users and their transmission formats. Channel measurement unit 402 outputs the available time slots when no external user is active, and the available bandwidth to be used during those time slots. In contrast, user data source 404 includes a data source for generating data, such as a user, computer program, or other entity for generating data. The data generated by user data source 404 includes a stream of data to be transmitted in the form of K-bit data words.

Adaptive code adjustment unit 406 receives available time slots and bandwidth information from channel measurement unit 402. Adaptive code adjustment unit 406 includes computer software or code that, when executed by a computer processor, determines the number of bits to be punctured, p, and number of bits to be shortened, s, for the next transmitted word. Adaptive code adjustment unit 406 makes these determinations using data received from channel measurement unit 402. For example, channel measurement unit 402 may reveal available time slots and available bandwidth, and adaptive code adjustment may determine a value for p and s that would adapt the code to fit within the available time slots and bandwidth. Particularly, p may be adjusted to fit the available time slots and s may be adjusted to fit the available bandwidth, or vice versa.

Similarly, adaptive code adjustment unit 406 further includes computer software or code that, when executed on a computer system, determines which of the multiplicity of bits are the best to puncture and shorten (not shown). A preferred technique for identifying which bits to puncture and shorten includes using a lookup table generated from previously published research. For example, D. N. Rowitch, *Convolution and Turbo-Coded Multicarrier Direct Sequence CDMA and Applications of Turbo Codes to Hybrid ARQ Communications Systems*, PhD Dissertation, University of California, San Diego, San Diego, June 1998 provides such published research.

In a related field, U.S. Published Application No. 2002/0075834 A1 ("Shah et al.") discloses a method of adaptive link quality measurement for a wireless medium. Shah et al. teaches means for testing a link and means for adjusting transmission on the link. Particularly, Shah et al. discloses a receiving node providing feedback to a transmitting node that includes a measured signal quality value, such as bit error rate, signal to noise ration or error vector magnitude. However, unlike the present application, Shah et al. provides no details on how to perform the adjustment based upon a measured signal quality.

Adjustable content register 408 is an adjustable content register that receives the K-bit data word from user data source 404 and outputs a (K-s)-bit data word. Particularly, adjustable content register 408 accepts the K-bit data word from user data source 404 and shortening information from adaptive code adjustment unit 406. Using the shortening information, such as shortening parameter s, adjustable content register 408 performs the appropriate shortening operations on the K-bit data word. Accordingly, adjustable content register 408 reduces the K-bit data word by shortening to a (K-s)-bit data word.

Adjustable content register 408 does not discard the shortened data bits. Rather, adjustable content register 408 retains the shortened data bits and appends them to the next data word before transmitting. In this manner, the shortening operation increases the number of code words required to represent the user source data received from user data source 404.

For example, if K=16 and s=6, adjustable content register 408 would receive a first 16-bit data word, shorten the first 16-bit data word by 6-bits to transmit a first 10-bit data word. The 6 shortened bits would be retained by register 408 and appended to a second 16-bit data word prior to shortening.

Thus, when adjustable content register 408 receives a second 16-bit data word, the 6 retained shortened bits are appended prior to shortening. Shortening is performed to form a second 10-bit data word having the 6 shortened bits and 4 bits of the second 16-bit data word. Thus, 12 bits of the second 16-bit data word are retained by adjustable content register, so that the third 10-bit data word that is transmitted would include 10 of the 12 remaining bits of the second 16-bit data word.

Adjustable content register 408 continues to accumulate the data bits that are shortened until it receives a full set of K-bit data words representative of the user source data received from user data source 404.

Rate (N,K) encoder 410 receives each (K-s)-bit data word from adjustable content register 408 and encodes it into an (N-s)-bit codeword including (K-s)-information bits and N-(K-s) parity bits. Rate (N,K) encoder 410 also receives puncturing information, such as puncturing parameter p and which particular bits to puncture, from adaptive code adjustment unit 406. Encoder 410 uses the puncturing information to perform the appropriate puncturing operation on the (N-s)-bit codeword. Accordingly, encoder 410 reduces the (N-s)-bit codeword by puncturing to a (N-s-p)-bit codeword.

Rate (N,K) encoder 408 provides code at a rate of $$R = \frac{K}{N}.$$

In a preferred embodiment of the invention, encoder 408 is a systematic encoder. In a systematic encoder the input data bits are present at the output of the encoding operation. An exemplary systematic encoder that may be used in accordance with the present invention is disclosed in U.S. patent application Ser. No. 6,122,763 ("Pyndiah et al."). Pyndiah et al. discloses a method for encoding a code word using the product of at least two systematic block codes. The code word is then decoded using iterative decoding techniques. Pyndiah et al. mentions that puncturing is a method for adjusting the effective rate of the code word. However, unlike the present invention, Pyndiah et al. does not teach or suggest puncturing in one dimension, such as time, and shortening with the other dimension, such as frequency.

Other coding techniques are also within the scope of the present invention. U.S. Patent Publication No. 2003/0126548 A1 ("Chapalain et al."), for example, describes a method of determining a turbo code with certain parameters. However, the object of Chapalain et al. is to obtain an error correcting code of desired parameters without puncturing. Chapalain et al. discloses a prior art technique using shortened bits and punctured bits distributed uniformly together along each dimension and states that puncturing causes a waste of redundancy. Thus, although the present invention may incorporate coding techniques from Chapalain et al., Chapalain et al. does not teach or suggest puncturing with one dimension and shortening with another.

In another embodiment of the invention, rate (N,K) encoder 408 is any encoder that generally has the capability to receive a K-bit data word and output an N-bit codeword. One of ordinary skill in the art will appreciate that the present invention is not restricted to systematic encoders.

Rate-adjustable modulator 412 modulates the incoming data stream of (N-s-p)-bit codewords using the shortening parameter s for transmission at a particular bit-rate. Particularly, modulator 412 is initially set to transmit $$\frac{N}{t}$$

bits per second on the channel. However, after receiving the (N-s-p) bit codeword from register 410 and the shortening parameter, s, from adaptive code adjustment unit 406, modulator 412 transmits the bits at a rate of $$\frac{(N-s)}{t}$$

bits per second over the channel. Given that the same baseline modulation is used, this reduction in bits per second reduces the bandwidth of the transmission, as desired. The duration of the actual transmitted word is thus $$\left(1 - \frac{p}{N-s}\right)t \le t,$$

thereby achieving the desired reduction in the duration of the transmission, as desired.

Figure 5:
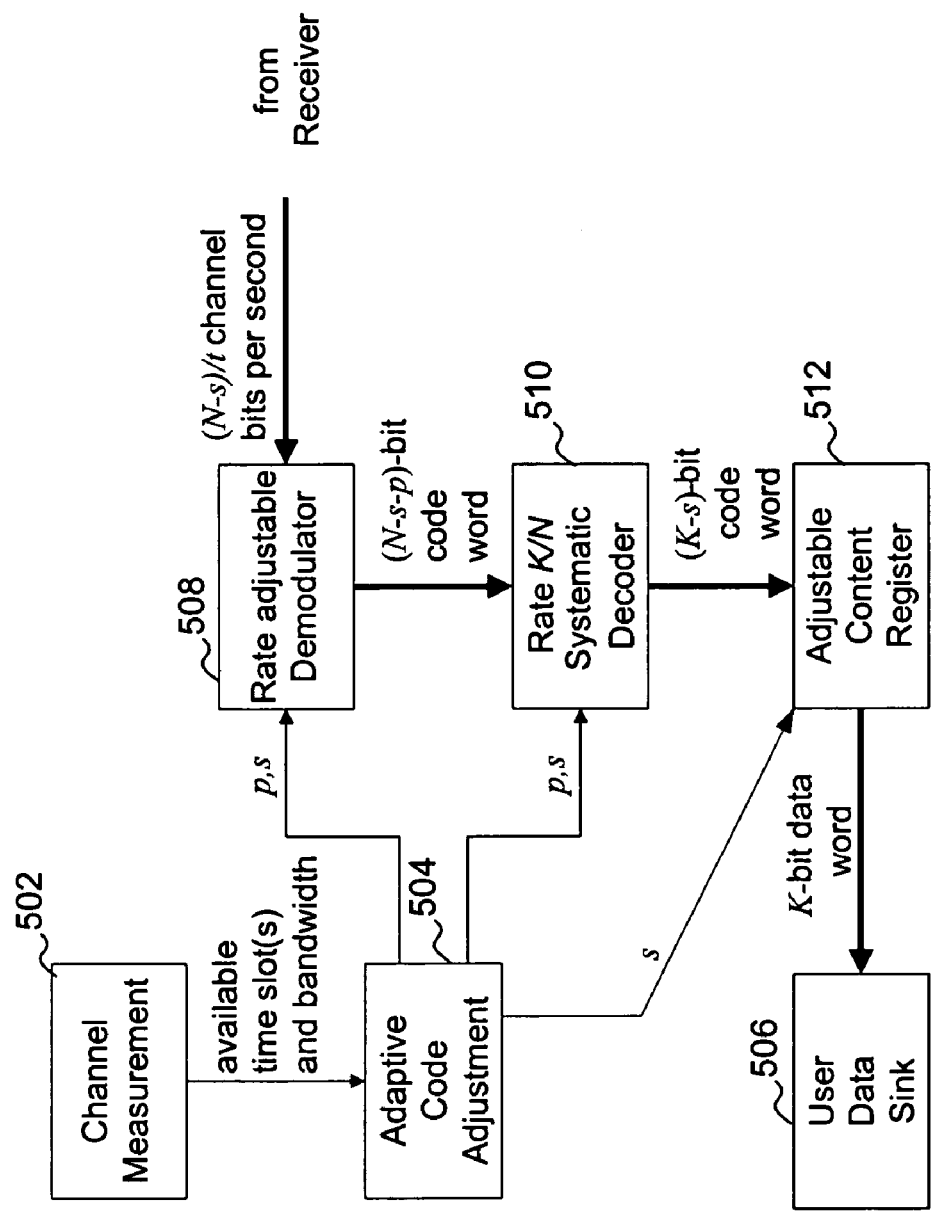
FIG. 5 is a schematic diagram of a communication receiver according to an exemplary embodiment of the present invention.

FIG. 5 is a schematic diagram of a portion of a communication receiver according to an exemplary embodiment of the present invention. The processes described above with respect to a portion of a communications transmitter are inverted in the depicted portion of a communications receiver to reconstitute the K-bit data word originally generated by user data source 404 in FIG. 4. As shown in FIG. 5, the portion of a communications receiver includes channel measurement unit 502, adaptive code adjustment unit 504, user data sink 506, rate-adjustable demodulator 508, rate K/N systematic decoder 510, and adjustable content register 512.

Channel measurement unit 502 is a channel measurement apparatus similar to channel measurement unit 402 described above. Particularly, channel measurement unit 502 outputs the available time slots when no external user is active, and the available bandwidth to be used during those time slots. Although not explicitly shown in FIGS. 4 and 5, in one embodiment of the invention the channel measurement unit 402 and channel measurement unit 502 exchange information by means of a communications link under control. Exchanging information allows the communication system to maintain appropriate synchronization between the transmitter and receiver versions of the channel estimates. In another embodiment of the invention, channel measurement units 402 and 502 do not exchange information.

Adaptive code adjustment unit 504 includes computer software or code similar to adaptive code adjustment unit 406 described above. Particularly, adaptive code adjustment unit 504 includes computer software or code that, when executed by a computer processor, determines the number of bits that were punctured, p, and number of bits that were shortened, s, from the next received word. Adaptive code adjustment makes these determinations using data received from channel measurement unit 502. For example, channel measurement unit 502 may reveal available time slots and available bandwidth, and adaptive code adjustment unit 504 may determine a value for p and s that would match the values in the transmitter.

Ideally, the channel measurement units in the transmitter 402 and the receiver 502 and the corresponding adaptive code adjustment units in the transmitter 404 and receiver 504 could be implemented independently in such a manner as to assure that they would agree on the channel conditions. In practice, however, this is unlikely to be possible for information theoretic reasons. Therefore, the preferred embodiment of the invention has a single channel measurement unit 402 and a single adaptive code adjustment unit 504 located at the transmitter. The parameters p and s for the next frame of information are then relayed to the receiver as part of the channel signaling overhead on the current transmission.

Rate adjustable demodulator 508 receives an incoming data signal at $$\frac{(N-s)}{t}$$

bits per second from the transmitter shown in FIG. 4 and demodulates the signal into (N-s-p)-bit code words using the shortening parameter s and the puncturing parameter p determined by adaptive code measurement 504 to perform the demodulation.

Rate K/N systematic decoder 510 receives each (N-s-p)-bit codeword including (K-s) information bits and N−(K-s) parity bits from demodulator 508 and decodes it into a (K-s)-bit data word. Decoder 510 corrects such errors as may be possible by the design of the code using the N−(K-s) parity bits. To perform the decoding operation, decoder 510 also receives puncturing information and shortening information, such as puncturing parameter p, shortening parameter s, and which particular bits were punctured and shortened, from adaptive code adjustment unit 504. Decoder 510 uses the puncturing and shortening information to perform the appropriate inverse puncturing and shortening operations to adjust the (N-s-p)-bit codeword to a N-bit codeword. Particularly, punctured parity bits are replaced by erasures, in keeping with standard decoding techniques. Shortened bits are replaced by fixed, known values, typically binary zeros, in keeping with standard decoding techniques. Decoder 510 performs a decoding operation on the N-bit codeword to produce a K-bit data word. The shortened bits, being known and fixed, are removed from the K-bit data word to produce a (K-s)-bit data word for output. That is, the decoder then produces an estimate of the basic (K-s)-bit shortened portion of the K-bit data word received from user data source 404 and shortened by adjustable content register 408 of FIG. 4.

Rate (N,K) decoder 510 decodes at a rate of $$R = \frac{K}{N}.$$

In a preferred embodiment of the invention, decoder 510 is a systematic decoder. In a systematic decoder the input data bits are present at the output of the decoding operation. In another embodiment of the invention, rate (N,K) decoder 510 is any decoder that has the capability to receive an N-bit codeword and output a K-bit data word. Although systematic encoders and decoders may offer efficiencies in the decoder implementation, one of ordinary skill in the art will appreciate that the present invention is not restricted, however, to systematic decoders. Further, one of ordinary skill in the art will appreciate that any optimum and sub-optimum decoding techniques that support erasure decoding may be used in accordance with the present invention.

Adjustable content register 512 is an adjustable content register that receives the (K-s)-bit data word from decoder 510 and outputs an K-bit data word. Particularly, register 512 receives the (K-s)-bit data word from decoder 510 and receives shortening information from adaptive code adjustment unit 504. Using the shortening information, such as shortening parameter s, adjustable content register 512 performs the appropriate inverse shortening operation on the (K-s)-bit data word to reconstitute output from decoder 510. Accordingly, adjustable content register 512 converts the (N-s-p)-bit codeword by inverse puncturing and shortening operations to an N-bit codeword.

For example, using the example described above in reference to FIG. 4 where K=16 and s=6, adjustable content register 512 receives a first 10-bit data word. If no other data has been accumulated in register 512, register 512 holds the first 10-bit data bit. When register 512 receives a second 10-bit data bit, it accumulates it in the register along with the other data in a FIFO format. After receiving the second 10-bit data word, register 512 has 20 data bits. Register 512 then sends off the first 16 bits as a first 16-bit data bit and retains the remaining 4 bits of data.

Register 512 continues to receive a multiplicity of such data words until a full set of K-bit data words representative of the user source data provided by user data source 404 in FIG. 4 is provided to user data sink 506.

User data sink 506 receives the estimate of the transmitted data word from decoder 510. The user data sink 506 is an abstraction referring to any user application that processes, analyzes or uses the data communicated by means of the adaptive transmission channel. The specific form of the user data sink is immaterial to this disclosure. This disclosure supports all such data sinks.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for encoding a data transmission of user data provided from a source, comprising:
   (a) measuring a communications channel to determine available time slots (time) and available bandwidth (frequency);
   (b) determining puncturing and shortening information from the available time slots and the available bandwidth, wherein puncturing information includes a number of bits p to be punctured and an identity of bits to be punctured and shortening information includes a number of bits s to be shortened and an identity of bits to be shortened;

(c) receiving a K-bit data word at an encoder from the user data source;

(d) shortening the K-bit data word by s bits prior to encoding to form a (K-s)-bit data word;

(e) retaining the s shortened bits for later transmission;

(f) encoding the (K-s)-bit data word into an (N-s)-bit code word, wherein N>K and N−(K-s) is a number of parity bits; and (g) performing puncturing operations on the (N-s)-bit code word to form an (N-s-p)-bit code word with (K-s) data bits, wherein puncturing is performed on a first dimension and shortening is performed on a second dimension.

2. The method of claim 1, wherein the first dimension is time and the second dimension is frequency.

3. The method of claim 1, wherein the first dimension is frequency and the second dimension is time.

4. The method of claim 1, wherein puncturing information is determined based on the available time slots and shortening is based on the available bandwidth.

5. The method of claim 1, wherein puncturing information is determined based on the available bandwidth and shortening is based on the available time slots.

6. The method of claim 1, wherein measuring a communications channel occurs in real-time.

7. The method of claim 1, further comprising modulating the (N-s-p)-bit code word for transmission over the communications channel at a rate of (N-s)/t bits per second.

8. The method of claim 1, wherein performing the puncturing and shortening operations results in the (N-s-p)-bit code word having a rate R(s,p)

$$R(s, p) = \frac{K-s}{N-s-p}, 0 \le s < K, 0 \le p \le N-K$$

that satisfies the relationship $$\frac{1}{N} \le R(s, p) \le 1.$$

9. A method for decoding a data transmission, comprising:
(a) measuring a communications channel to determine available time slots and available bandwidth;
(b) determining puncturing and shortening information from the available time slots and the available bandwidth, wherein puncturing information includes a number of bits p to be inversely punctured and an identity of bits to be inversely punctured, and shortening information includes a number of bits s to be inversely shortened and an identity of bits to be inversely shortened;
(c) receiving at a receiver a data stream of code words, each in accordance with an (N-s-p)-bit code;
(d) demodulating each (N-s-p)-bit code word from the data stream;
(e) decoding each (N-s-p)-bit code word into a (K-s)-bit data word;
(f) receiving a multiplicity of (K-s)-bit data words sufficient to decode a full set of K-bit data words representative of a user source data contained in the data stream.

10. The method of claim 9, wherein the first dimension is time and the second dimension is frequency.

11. The method of claim 9, the first dimension is frequency and the second dimension is time.

12. The method of claim 9, wherein puncturing information is determined based on the available time slots and shortening is based on the available bandwidth.

13. The method of claim 9, wherein puncturing information is determined based on the available bandwidth and shortening is based on the available time slots.

14. The method of claim 9, wherein measuring a communications channel occurs in real-time.

15. The method of claim 9, wherein the code word is received at a demodulator at a rate of (N-s)/t bits per second and demodulated to a rate of N/t.

16. The method of claim 9, further comprising sending the data word to a user data sink.

17. The method of claim 9, wherein decoding further comprises correcting errors using N−(K-s) parity bits.

* * * * *